(12) United States Patent
Dipasquale

(10) Patent No.: US 8,976,814 B2
(45) Date of Patent: Mar. 10, 2015

(54) METHOD OF TRANSPORTING DATA FROM SENDING NODE TO DESTINATION NODE

(75) Inventor: Michael Thomas Dipasquale, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 493 days.

(21) Appl. No.: 13/315,955

(22) Filed: Dec. 9, 2011

(65) Prior Publication Data

US 2013/0148671 A1 Jun. 13, 2013

(51) Int. Cl.
*H04J 3/24* (2006.01)
*H04L 29/06* (2006.01)
*H04L 12/54* (2013.01)

(52) U.S. Cl.
CPC .... *H04L 29/06136* (2013.01); *H04L 29/06102* (2013.01); *H04L 12/56* (2013.01)
USPC .......................................... 370/474; 709/246

(58) Field of Classification Search
CPC ......................................................... H04J 3/24
See application file for complete search history.

(56) References Cited

U.S. PATENT DOCUMENTS

| | | | |
|---|---|---|---|
| 4,970,714 A | 11/1990 | Chen et al. | |
| 5,699,521 A * | 12/1997 | Iizuka et al. | 709/240 |
| 6,289,012 B1 | 9/2001 | Harrington et al. | |
| 6,711,179 B1 * | 3/2004 | Hanaoka et al. | 370/474 |
| 7,835,361 B1 * | 11/2010 | Dubrovsky et al. | 370/394 |
| 7,865,610 B2 * | 1/2011 | Schmid et al. | 709/232 |
| 7,895,256 B2 | 2/2011 | Zombek et al. | |
| 8,301,982 B2 * | 10/2012 | Ver Steeg et al. | 714/776 |
| 8,656,435 B2 * | 2/2014 | Ashby et al. | 725/58 |
| 2003/0036400 A1 * | 2/2003 | Casaccia | 455/515 |
| 2003/0039250 A1 * | 2/2003 | Nichols et al. | 370/394 |

(Continued)

FOREIGN PATENT DOCUMENTS

| | | |
|---|---|---|
| EP | 2073181 A1 | 6/2009 |
| JP | 2009015392 A | 1/2009 |
| WO | 2010039838 A1 | 4/2010 |

OTHER PUBLICATIONS

Search Report and Written Opinion from corresponding EP Application No. 12195915.9-1853 dated Jun. 10, 2013.

(Continued)

*Primary Examiner* — Bunjob Jaroenchonwanit
(74) *Attorney, Agent, or Firm* — Dority & Manning, P.A.

(57) ABSTRACT

A method of transporting data from a sending node to a destination node includes processing select data to form a stream of data packets at a sending node for transport to a destination node. The stream including a group of data packets. The group carrying a segment of the select data. The segment including fragments of the select data. The segment associated with a segment identifier. Each fragment associated with a fragment identifier. Each group data packet carries a corresponding fragment, a fragment identification value, a segment identification value, and a verification check value. A last group data packet carries an end of segment value. The method includes transmitting the group of data packets to the destination node, with the last data packet transmitted last such that the transmitting continues without waiting for a segment response message from the destination node between transmissions of the group of data packets.

14 Claims, 10 Drawing Sheets

(56) References Cited

U.S. PATENT DOCUMENTS

| | | | |
|---|---|---|---|
| 2004/0064497 A1* | 4/2004 | Debey | 709/201 |
| 2004/0068571 A1* | 4/2004 | Ahmavaara | 709/228 |
| 2004/0093420 A1 | 5/2004 | Gamble | |
| 2004/0199809 A1 | 10/2004 | Hanam et al. | |
| 2005/0022254 A1* | 1/2005 | Adolph et al. | 725/135 |
| 2005/0123283 A1* | 6/2005 | Li | 386/124 |
| 2005/0165857 A1* | 7/2005 | Naka et al. | 707/200 |
| 2006/0004904 A1* | 1/2006 | Sarangam et al. | 709/200 |
| 2006/0101111 A1* | 5/2006 | Bouse et al. | 709/200 |
| 2006/0259845 A1* | 11/2006 | Baek | 714/748 |
| 2008/0096562 A1* | 4/2008 | Wu et al. | 455/436 |
| 2009/0279429 A1 | 11/2009 | Griffoul | |
| 2010/0195488 A1 | 8/2010 | Mehrotra et al. | |
| 2010/0199146 A1* | 8/2010 | Sato et al. | 714/758 |
| 2010/0265891 A1* | 10/2010 | Belcea | 370/328 |
| 2011/0225482 A1* | 9/2011 | Chan et al. | 715/207 |
| 2011/0314174 A1* | 12/2011 | Joung et al. | 709/231 |
| 2012/0033556 A1* | 2/2012 | Kruglick | 370/241 |
| 2012/0042089 A1* | 2/2012 | Chen et al. | 709/231 |
| 2012/0047119 A1* | 2/2012 | Kandekar et al. | 707/705 |
| 2012/0110629 A1* | 5/2012 | Ruiz Alonzo et al. | 725/110 |
| 2012/0323849 A1* | 12/2012 | Garin et al. | 707/617 |
| 2013/0042013 A1* | 2/2013 | Bouazizi | 709/228 |
| 2013/0091251 A1* | 4/2013 | Walker et al. | 709/219 |
| 2014/0160956 A1* | 6/2014 | Chen et al. | 370/252 |

OTHER PUBLICATIONS

Diamantis, I. et al., "Real time video distribution using publication through a database", Computer Graphics, Image Processing, and Vision, 1998. Proceedings. SI BGRAPI'98. International Symposium on Rio De Janeiro, Brazil Oct. 20-23, 1998, Los Alamitos, CA, USA,IEEE Comput. Soc, US, pp. 208-215, Oct. 20, 1998.

Al-Jaroodi, Jameela et al., "DDFTP: Dual-Direction FTP", Cluster, Cloud and Grid Computing (CCGRID), 2011 11th IEEE/ACM International Symposium on, IEEE, pp. 504-513, May 23, 2011.

Sliding window protocol, Wikipedia: the free encyclopedia, printed from http://en.wikipedia.org/wiki/Sliding_window_protocol on Oct. 14, 2011, 7 pages.

Basu et al., A Reliable Multicast Protocol for Unidirectional Satellite Link, Proceedings of the Symposium on Applications and the Internet, Jan. 27-31, 2003, pp. 390-393.

Japanese Pat. App. Publication No. 2009-015392, Jan. 1, 2009, English Abstract, Patent Abstracts of Japan, 1 page.

European Pat. App. Publication No. 2073181 A1, Jun. 24, 2009, English Abstract, Thompson Reuters, 1 page.

Search Report and Written Opinion from corresponding EP Application No. 12195915.9-1853 dated Oct. 15, 2013.

Al-Jaroodi, Jameela et al., "DDFTP: Dual-Direction FTP", Cluster, Cloud and Grid Computing (CCFRID), 2011 11th IEEE/ACM International Symposium on, IEEE, pp. 504-513, May 23, 2011.

* cited by examiner

METHOD OF TRANSPORTING DATA FROM SENDING NODE TO DESTINATION NODE

BACKGROUND OF THE INVENTION

1. Field of the Invention

The subject matter disclosed herein relates to transporting data between communication nodes, including techniques for transmitting data from a sending node and for receiving data at a destination node.

2. Discussion of the Prior Art

A communication protocol is a formal description of digital message formats and the rules for exchanging those messages in or between computing systems. For example, the Open Systems Interconnection (OSI) model employs standard functions for a communication system in various abstraction layers. An OSI layer provides service to the layer above it while gathering data from the layer below it. The OSI model includes physical, data link, network, transport, session, presentation, and application layers.

A transport layer for communications between communication devices provides end-to-end communication services for applications within a layered architecture of components and protocols. These services include connection-oriented data stream support, reliability, flow control, and multiplexing. Some examples of transport layer communication protocols used in computer networking are the user datagram protocol (UDP) and transmission control protocol (TCP).

For any given data transfer, there is a sender of the data and a recipient of the data. Typically, transport layer communication protocols break up a large amount of data to be transferred into small data packets which can easily be managed by the communications components used for the transfer. Each data packet typically includes information that enables the recipient to verify the reliability of the data packet. For example, the data packets may include a checksum parameter which the recipient can check to ensure that the data received was not altered in the transmission.

For each received data packet, the recipient typically responds to the sender with a packet that acknowledges the receipt of the corresponding packet to inform the sender the data packet was delivered and the next data packet can be sent (see FIGS. 1 and 2). This technique introduces latency delays because only one item can be sent at a time; either the data being transported or the acknowledgement. Larger data packet sizes may increase efficiency in this case, but require large amounts of data to be resent in the case of data loss.

Some transport protocols, such as TCP may utilize a sliding window protocol in which the transmitter can continue sending additional data packets while waiting for the acknowledgement of an earlier data packet. The round-trip time (RTT) and bandwidth capabilities may be taken into account in order to determine a limit on the amount of data that can be sent before stopping to wait for an acknowledgement for the sliding window technique. Again, the efficiency of this technique suffers greatly if data is not successfully transmitted and requires retransmission. Other protocols, such as UDP will stream packet data and not account for data loss or provide retransmissions. Thus, UDP provides an unreliable service in which data packets may arrive out of order, appear duplicated, or go missing without notice.

Based on the foregoing, techniques that provide reliable data communications between communication nodes in less time, particularly for transporting large amounts of data (e.g., greater than 1000 bytes), are desirable to increase transport speed. Additionally, it is desirable that such techniques include an efficient retransmission algorithm.

BRIEF DESCRIPTION OF THE INVENTION

In one aspect, a method of transporting data is provided. In one embodiment, the method includes processing select data to form a stream of data packets. The stream of data packets comprising at least a first group of data packets. The first group of data packets carrying a first segment of the select data. The first segment comprising a first plurality of fragments of the select data. The first segment associated with a unique segment identifier in relation to the select data. Each fragment in the first plurality of fragments associated with a unique fragment identifier in relation to at least one of the first segment and the select data, wherein each data packet of the first group carries a corresponding fragment of the first plurality of fragments, the fragment identifier associated with the corresponding fragment, the segment identifier associated with the first segment, and a verification check value for use in verifying the corresponding data packet. A last data packet of the first group carries an end of segment value identifying the corresponding data packet as the last data packet of the first group. The method further comprising transmitting the first group from a sending node to a destination node via one or more communication paths, with the last data packet of the first group being transmitted last such that the transmitting continues without waiting for a first segment response message from the destination node between transmissions of the data packets of the first group.

In another aspect, a method of transporting data is provided. In one embodiment, the method includes receiving a first data packet from a sending node at a destination node. The first data packet associated a stream of data packets transporting select data from the sending node to the destination node via one or more communication paths. The stream of data packets comprising at least a first group of data packets with which the first data packet is associated. The first group of data packets carrying a first segment of the select data. The first segment comprising a first plurality of fragments of the select data. The first segment associated with a unique segment identifier in relation to the select data. Each fragment in the first plurality of fragments associated with a unique fragment identifier in relation to at least one of the first segment and the select data. Each data packet of the first group carries a corresponding fragment of the first plurality of fragments, the fragment identifier associated with the corresponding fragment, the segment identifier associated with the first segment, and a verification check value for use in verifying the corresponding data packet. A last data packet of the first group carries an end of segment value identifying the corresponding data packet as the last data packet of the first group. The method further comprising performing a verification check on the first data packet using the verification check value carried by the first data packet. The method further comprising storing a positive or negative result of the verification check on the first data packet and the corresponding segment and fragment identifiers in a segment response message buffer. Repeating the receiving, performing, and storing for the next data packet of the first group until the last data packet of the first group is received. The method further comprising detecting the end of segment value in the last data packet of the first group. The method further comprising processing information stored in the segment response message buffer to form a first segment response message associated with the first group. The method further comprising transmitting the first segment response message from the destination node to the sending node via the one or more communication paths.

In yet another aspect, a non-transitory computer-readable medium storing program instructions is provided. When executed by a computer, the program instructions cause a corresponding computer-controlled communication node to perform a method of transporting data. In one embodiment, the method includes processing first select data to form a first stream of data packets. The first stream of data packets comprising at least a first group of data packets. The first group of data packets carrying a first segment of the first select data. The first segment comprising a first plurality of fragments of the first select data. The first segment associated with a unique segment identifier in relation to the first select data. Each fragment in the first plurality of fragments associated with a unique fragment identifier in relation to at least one of the first segment and the first select data. Each data packet of the first group carries a corresponding fragment of the first plurality of fragments, the fragment identifier associated with the corresponding fragment, the segment identifier associated with the first segment, and a verification check value for use in verifying the corresponding data packet. A last data packet of the first group carries an end of segment value identifying the corresponding data packet as the last data packet of the first group. The method further comprising transmitting the first group from a communication node to a destination node via one or more communication paths, with the last data packet of the first group being transmitted last such that the transmitting continues without waiting for a first segment response message from the destination node between transmissions of the data packets of the first group.

In still another aspect, a method is provided. In one embodiment, the method includes processing data into a plurality of data segments. Each comprising a plurality of data fragments. The data fragments include respective fragment identifiers and a segment identifier of the segment of which they are a part. The method further comprising transmitting the data fragments from a sending node to a destination node. The method further comprising, responsive to receiving a first message from the destination node indicating that one or more fragments of one of the segments was not received by the destination node, communicating said one or more fragments to the destination node along with a final fragment of said one of the segments to indicate re-transmission. The method further comprising, subsequent to communicating each segment, if the sending node does not receive the first message or a second message indicating successful receipt of the segment, re-communicating the last fragment of the segment to the destination node.

BRIEF DESCRIPTION OF THE DRAWINGS

These and other features and aspects of the invention will become better understood with reference to the accompanying drawings in which like characters represent like parts, and wherein.

DETAILED DESCRIPTION OF THE INVENTION

Figure 1:
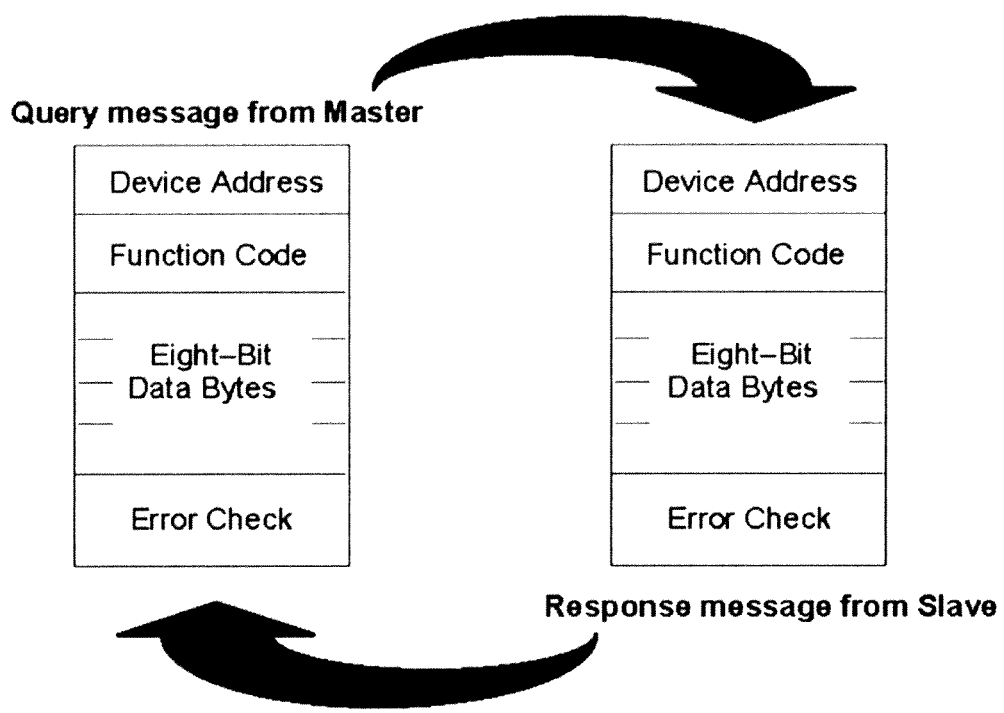
FIG. 1 is a function diagram of an existing process for exchanging packet data between devices using conventional communication protocols.
Figure 2:
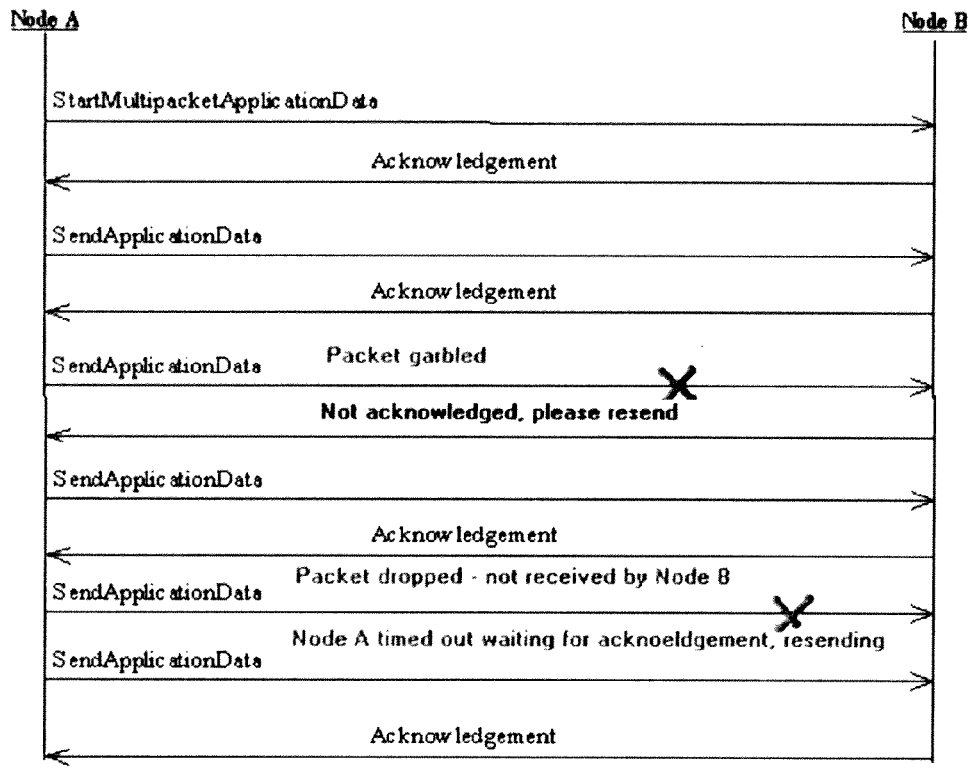
FIG. 2 is a data/message flow diagram for the exchange of packet data between devices using conventional communication protocols.

This disclosure describes various embodiments of methods for transporting data from a sending node to a destination node. Various embodiments of communication nodes that may be used to send or receive the transported data are also described. The various techniques described may be implemented in a transport layer communications protocol to facilitate data transfers, for example, from a host/master device that operates as a sender of data to one or more client/slave devices that operates as a recipient of the data.

In one exemplary embodiment of a process for transporting data from a sender to a recipient, the sender breaks up large amount of data into fragments. Both the sender and the recipient may agree ahead of time on the fragment size. The sender groups multiple fragments into a segment. The sender and the recipient may agree ahead of time how many fragments will exist in any given segment. Each fragment may include a fragment number (e.g., 16 bit) and a segment number (e.g., 16 bits). After the fragments for the segment are transmitted by the sender, the sender receives an acknowledge packet from the recipient.

If the last packet in a segment is received by the sender and not all fragments within the segment were received, the recipient will send a 'not acknowledge' packet to the sender. The 'not acknowledgement' packet will include indices of the segment number and fragment numbers of fragments within the segment that were not received by the recipient. The sender will respond to the 'not acknowledgement' packet by re-sending each fragment specified as not having been received and the last fragment in the segment. Re-sending the last fragment of the segment tells the recipient that the fragments that were not received were re-sent and that all fragments for the segment should have been received at this point.

If the sender has completed sending all fragments for the segment and does not receive an acknowledge packet or a 'not acknowledge' packet from the recipient within a timeout period, the sender resends the last fragment in the segment. Re-sending the last packet of the segment again tells the recipient that all fragments for the segment should have been received at this point.

This technique reduces latency and bandwidth requirements by sending a group of fragments and waiting for an acknowledgement. The retransmission algorithm is efficient in that fragments that were successfully received are not retransmitted. The only exception is where the last fragment was successfully received, but an earlier fragment in the same segment was not successfully received, both the earlier fragment and the last fragment are retransmitted. The technical effect is faster data transfers or downloads that have at least the same reliability as current methods for transporting data due to reduced messaging between sender and recipient nodes or devices.

The technical and commercial advantages resulting from increased speed for data transfers is a more positive user experience. In one application, the technique described above may be implemented to load firmware from a communication terminal by transporting the firmware via one or more communication path to a sodium battery management system. In this exemplary application, the transport time was measured to be approximately one third of the time it would take using a transport protocol that acknowledges every packet.

As disclosed herein, a communication node or device may include, but is not limited to, a personal computer, a server, a hand-held or laptop device, a mobile device (such as a mobile phone, a personal digital Assistant (PDA), a media player, and the like), a multiprocessor system, a consumer electronic device adapted for communications, a mini computer, a mainframe computer, a distributed computing environment, or any suitable computer platform, computer-controlled device, or communication node.

Communication nodes disclosed herein may include a local storage device or have access to external storage devices for storage of data to be transmitted or received, including intermediate forms of the data, temporary copies of transmitted data while awaiting acknowledgement, and information regarding segment response messages while awaiting receipt of the last fragment for the corresponding segment. As disclosed herein, the storage device may include, but is not limited to, a volatile memory device (such as random access memory (RAM)), a non-volatile memory device (such as read-only memory (ROM), flash memory, etc.), a magnetic storage device, an optical storage device, or any suitable storage device in any combination.

Communication nodes disclosed herein include a communication interface. As disclosed herein, the communication interface may include, but is not limited to, a modem, a network interface, a radio frequency (RF) transceiver, an infrared (IR) port, a universal system bus (USB) port, or any suitable communication interface in any combination. The communication interface may include a wired connection, wireless connection, or any suitable combination thereof.

Communication nodes disclosed herein may include input device(s), such as a keyboard, a keypad, a microphone, a pointing device, a mouse, a trackball, a joystick, a touch screen, a touch pad, a camera, or any suitable input device in any combination. Communication nodes disclosed herein may include output device(s), such as a display, a speaker, a printer, a monitor, or any suitable output device in any combination.

Figure 3:
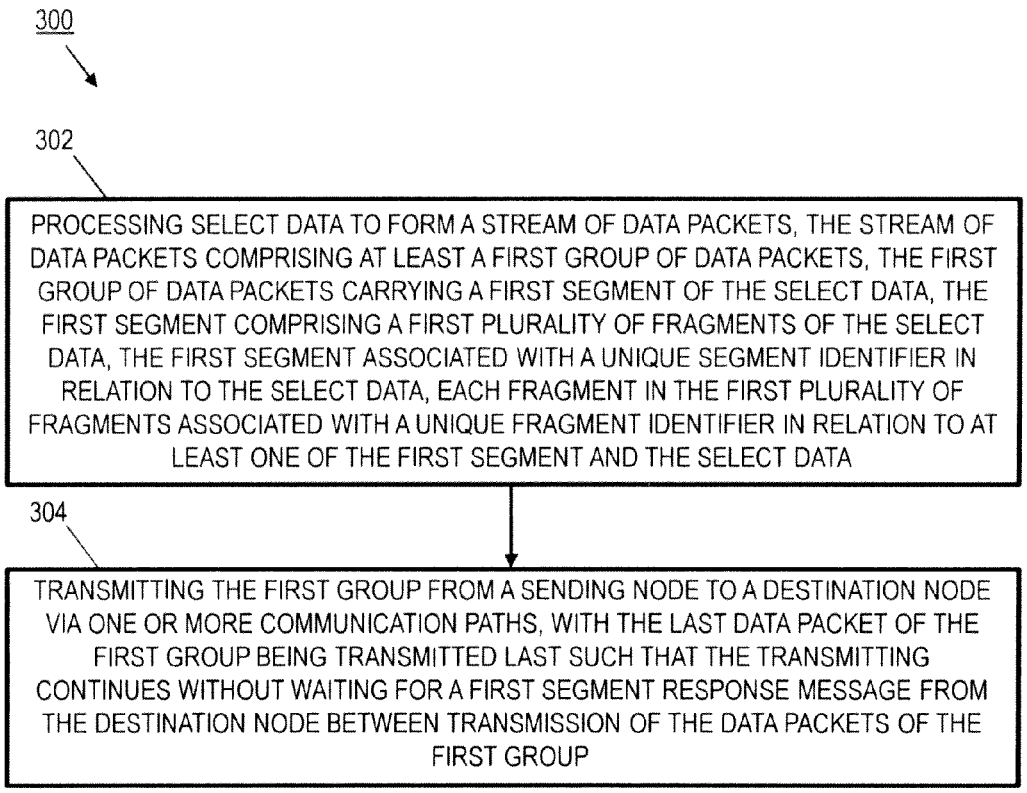
FIG. 3 is a flow chart of an exemplary embodiment of a process for transporting data from a sending node to a destination node.

With reference to FIG. 3, an exemplary embodiment of a process 300 for transporting data from a sending node to a destination node begins at 302 where select data is processed to form a stream of data packets at a sending node for transporting the select data from the sending node to a destination node via one or more communication paths. The stream of data packets comprising at least a first group of data packets. The first group of data packets carrying a first segment of the select data. The first segment comprising a first plurality of fragments of the select data. The first segment associated with a unique segment identifier in relation to the select data. Each fragment in the first plurality of fragments associated with a unique fragment identifier in relation to at least one of the first segment and the select data.

Each data packet of the first group carries a corresponding fragment of the first plurality of fragments, a fragment identification value representing the fragment identifier associated with the corresponding fragment, a segment identification value representing the segment identifier associated with the first segment, and a verification check value for use in verifying the corresponding data packet. A last data packet of the first group carries an end of segment value identifying the corresponding data packet as the last data packet of the first group.

At 304, the first group is transmitted from the sending node to the destination node via the one or more communication paths, with the last data packet of the first group being transmitted last such that the transmitting continues without waiting for a first segment response message from the destination node between transmissions of the data packets of the first group.

In another embodiment of the process 300, the fragments of the select data are a size known to both the sending node and the destination node. In yet another embodiment of the process 300, a quantity of fragments for the first plurality of fragments that form the first segment is known to both the sending node and the destination node. In still another embodiment of the process 300, the verification check value associated with each data packet is a checksum value for the corresponding data packet.

Figure 4:
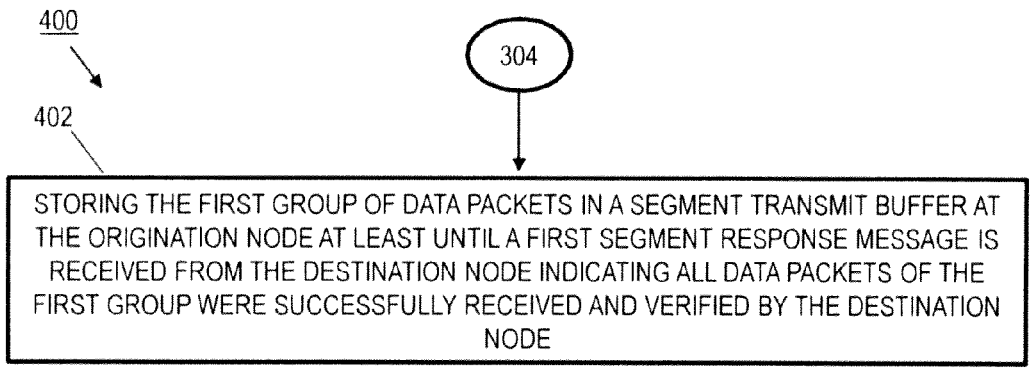
FIG. 4, in combination with FIG. 3, is a flow chart of another exemplary embodiment of a process for transporting data from a sending node to a destination node.

With reference to FIGS. 3 and 4, another exemplary embodiment of a process 400 for transporting data from a sending node to a destination node includes the process 300 of FIG. 3 and continues from 304 to 402 where the first group of data packets is stored in a segment transmit buffer at the sending node at least until a first segment response message is received from the destination node indicating all data packets of the first group were successfully received and verified by the destination node.

Figure 5:
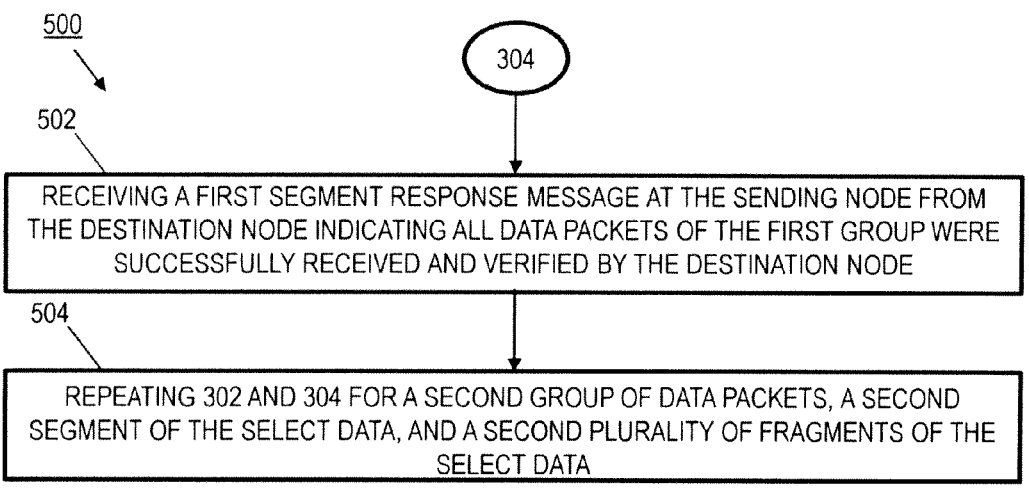
FIG. 5, in combination with FIG. 3, is a flow chart of yet another exemplary embodiment of a process for transporting data from a sending node to a destination node.

With reference to FIGS. 3 and 5, yet another exemplary embodiment of a process 500 for transporting data from a sending node to a destination node includes the process 300 of FIG. 3 and continues from 304 to 502 where a first segment response message is received at the sending node from the destination node indicating all data packets of the first group were successfully received and verified by the destination node. At 504, the process 500 continues by repeating 302 and 304 for a second group of data packets, a second segment of the select data, and a second plurality of fragments of the select data. In this embodiment, the stream of data packets also comprises at least the second group of data packets, the second group of data packets carries the second segment, and the second segment comprises the second plurality of fragments.

Figure 6:
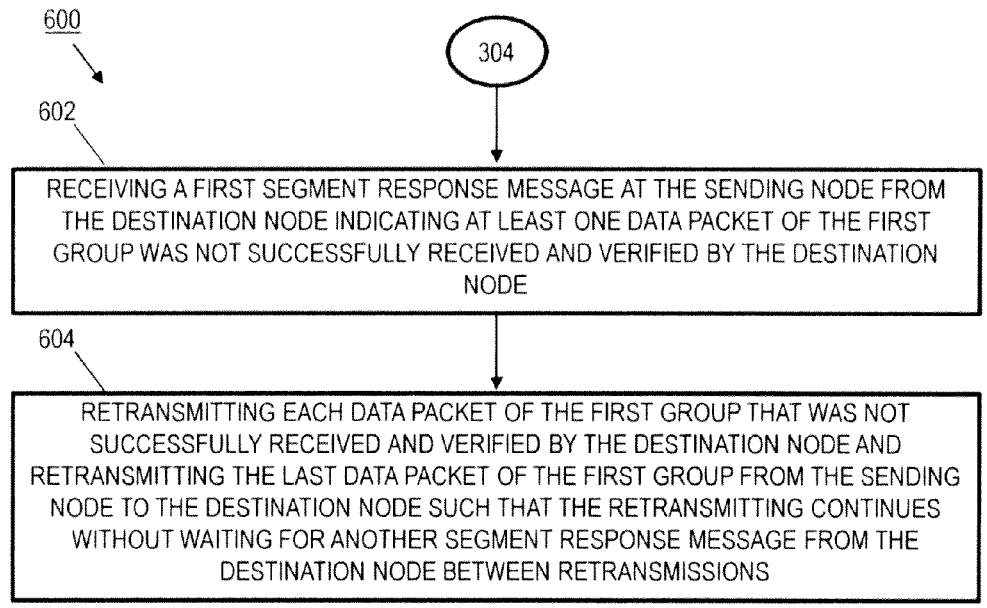
FIG. 6, in combination with FIG. 3, is a flow chart of still another exemplary embodiment of a process for transporting data from a sending node to a destination node.

With reference to FIGS. 3 and 6, yet another exemplary embodiment of a process 600 for transporting data from a sending node to a destination node includes the process 300 of FIG. 3 and continues from 304 to 602 where a first segment response message is received at the sending node from the destination node indicating at least one data packet of the first group was not successfully received and verified by the destination node. At 604, the process 600 continues by retransmitting each data packet of the first group that was not successfully received and verified by the destination node and retransmitting the last data packet of the first group from the sending node to the destination node such that the retransmitting continues without waiting for another segment response message from the destination node between retransmissions. In another embodiment of the process 600, the first segment response message from the destination node indicates the segment and fragment identifiers associated with each data packet of the first group that was not successfully received and verified.

Figure 7:
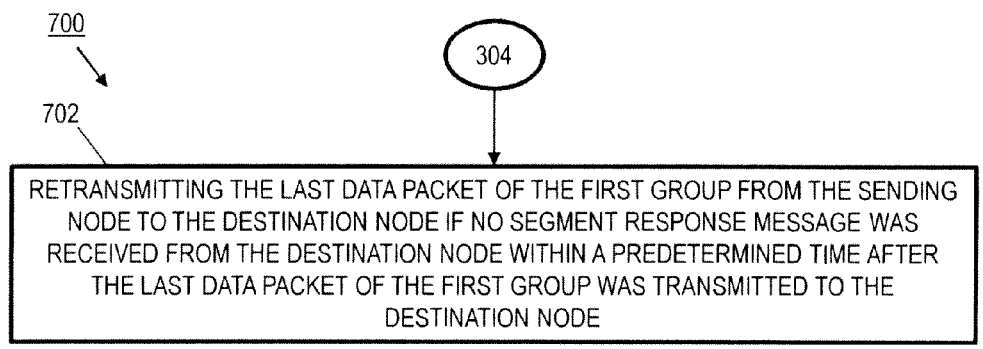
FIG. 7, in combination with FIG. 3, is a flow chart of still yet another exemplary embodiment of a process for transporting data from a sending node to a destination node.

With reference to FIGS. 3 and 7, yet another exemplary embodiment of a process 700 for transporting data from a sending node to a destination node includes the process 300 of FIG. 3 and continues from 304 to 702 where the last data packet of the first group is retransmitted from the sending node to the destination node if no segment response message was received from the destination node within a predetermined time after the last data packet of the first group was transmitted to the destination node.

Figure 8:
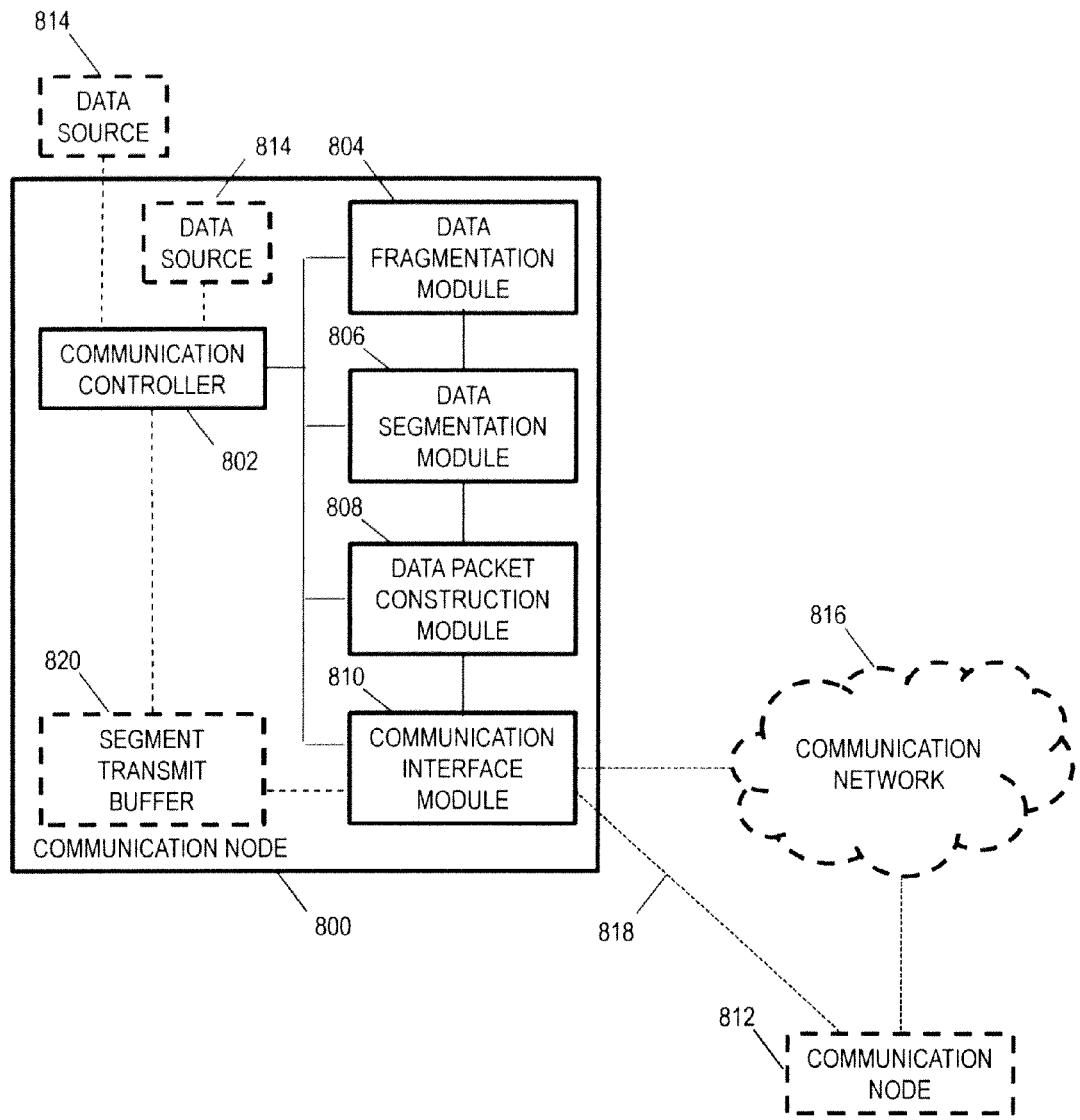
FIG. 8 is a block diagram of an exemplary embodiment of a communication node for transporting data from a sending node to a destination node.

With reference to FIG. 8, an exemplary embodiment of a communication node 800 includes a communication controller 802, a data fragmentation module 804, a data segmentation module 806, a data packet construction module 808, and a communication interface module 810. The communication node 800 (i.e., sending node) for transporting data to another communication node 812 (i.e., destination node). The communication controller 802 for controlling the processing of select data from a data source 814 by the data fragmentation module 804, data segmentation module 806, and data packet construction module 808 to form a stream of data packets. The data source 814 may be internal to the communication node 800 or external. The data source 814 may be a file stored on a storage device, a stream of data output from a device or application program, or any suitable source of data. The communication controller 802 also for controlling the communication interface module 810 for sending the stream of data packets to the destination node 812. The stream of data packets may be transported to the destination node 812 via a communication network 816 accessible to both the sending node 800 and destination node 812.

The communication network 816 may include any suitable type of communication network. In various embodiments, the communication network 816 may include multiple communication networks and multiple types of communication networks in any suitable combination. For example, the communication network 816 may include any combination of a local area network (LAN), wide area network (WAN), wired network, wireless network, cellular network, satellite communication network, telephone network, public switched telephone network (PSTN), radio communication network, satellite television network, a cable television network, intranet, internet (including the Internet), and any suitable communication network. The stream of data packets may be transported to the destination node 812 via one or more communication paths through the communication network 816. In another embodiment, the stream of data packets may be transported to the destination node 812 via a direct communication path 818 between the sending node 800 and destination node 812.

The data fragmentation module 804 for dividing the select data into fragments. The data segmentation module 806 for grouping the fragments of the select data into segments. The data packet construction module 808 for forming the stream of data packets from the fragments and segments of the select data. The data packet construction module 808 forming the stream of data packets in groups of data packets such that each data packet corresponds to a fragment of the select data and each group of data packets corresponds to a segment of the select data.

The stream of data packets formed by the data packet construction module 808 comprising at least a first group of data packets. The first group of data packets carrying a first segment of the select data. The first segment comprising a first plurality of fragments of the select data. The first segment associated with a unique segment identifier in relation to the select data. Each fragment in the first plurality of fragments associated with a unique fragment identifier in relation to at least one of the first segment and the select data. In this embodiment, each data packet of the first group carries a corresponding fragment of the first plurality of fragments, a fragment identification value representing the fragment identifier associated with the corresponding fragment, a segment identification value representing the segment identifier associated with the first segment, and a verification check value for use in verifying the corresponding data packet. A last data packet of the first group carries an end of segment value identifying the corresponding data packet as the last data packet of the first group.

The communication interface module 810 for receiving the first group of data packets from the data packet construction module 808 and, under control of the communication controller 802, for transmitting the first group from the sending node 800 to the destination node 812 via the one or more communication paths, with the last data packet of the first group being transmitted last such that the transmitting continues without waiting for a first segment response message from the destination node 812 between transmissions of the data packets of the first group.

In another embodiment of the communication node 800, the fragments of the select data are a size known to both the communication controller 802 and the destination node 812. In yet another embodiment of the communication node 800, a quantity of fragments for the first plurality of fragments that form the first segment is known to both the communication controller 802 and the destination node 812. In still another embodiment of the communication node 800, the verification check value associated with each data packet by the data packet construction module 808 is a checksum value for the corresponding data packet.

In still yet another embodiment, the communication node 800 also includes a segment transmit buffer 820 for storing the first group of data packets at least until a first segment response message is received from the destination node 812 indicating all data packets of the first group were successfully received and verified by the destination node 812.

In another embodiment of the communication node 800, after receiving a first segment response message at the communication controller 802 via the communication interface module 810 from the destination node 812 indicating all data packets of the first group were successfully received and verified by the destination node 812, the communication controller 802 controls the data fragmentation module 804, data segmentation module 806, data packet construction module 808, and communication interface module 810 for a second group of data packets, a second segment of the select data, and a second plurality of fragments of the select data. In this embodiment, the stream of data packets also comprises at least the second group of data packets, the second group of data packets carries the second segment, and the second segment comprises the second plurality of fragments.

In yet another embodiment of the communication node 800, after receiving a first segment response message at the communication controller 802 via the communication interface module 810 from the destination node 812 indicating at least one data packet of the first group was not successfully received and verified by the destination node, the communication controller 802 controls the communication interface module 810 for retransmitting each data packet of the first group that was not successfully received and verified by the destination node 812 and for retransmitting the last data packet of the first group to the destination node 812 such that the retransmitting continues without waiting for another segment response message from the destination node 810 between retransmissions. In a further embodiment of the communication node 800, the first segment response message from the destination node 812 indicates the segment and fragment identifiers associated with each data packet of the first group that was not successfully received and verified.

In still another embodiment of the communication node 800, the communication controller 802 controls the communication interface module 810 for retransmitting the last data packet of the first group to the destination node 812 if no segment response message was received from the destination node 812 within a predetermined time after the last data packet of the first group was transmitted to the destination node 812.

Figure 9:
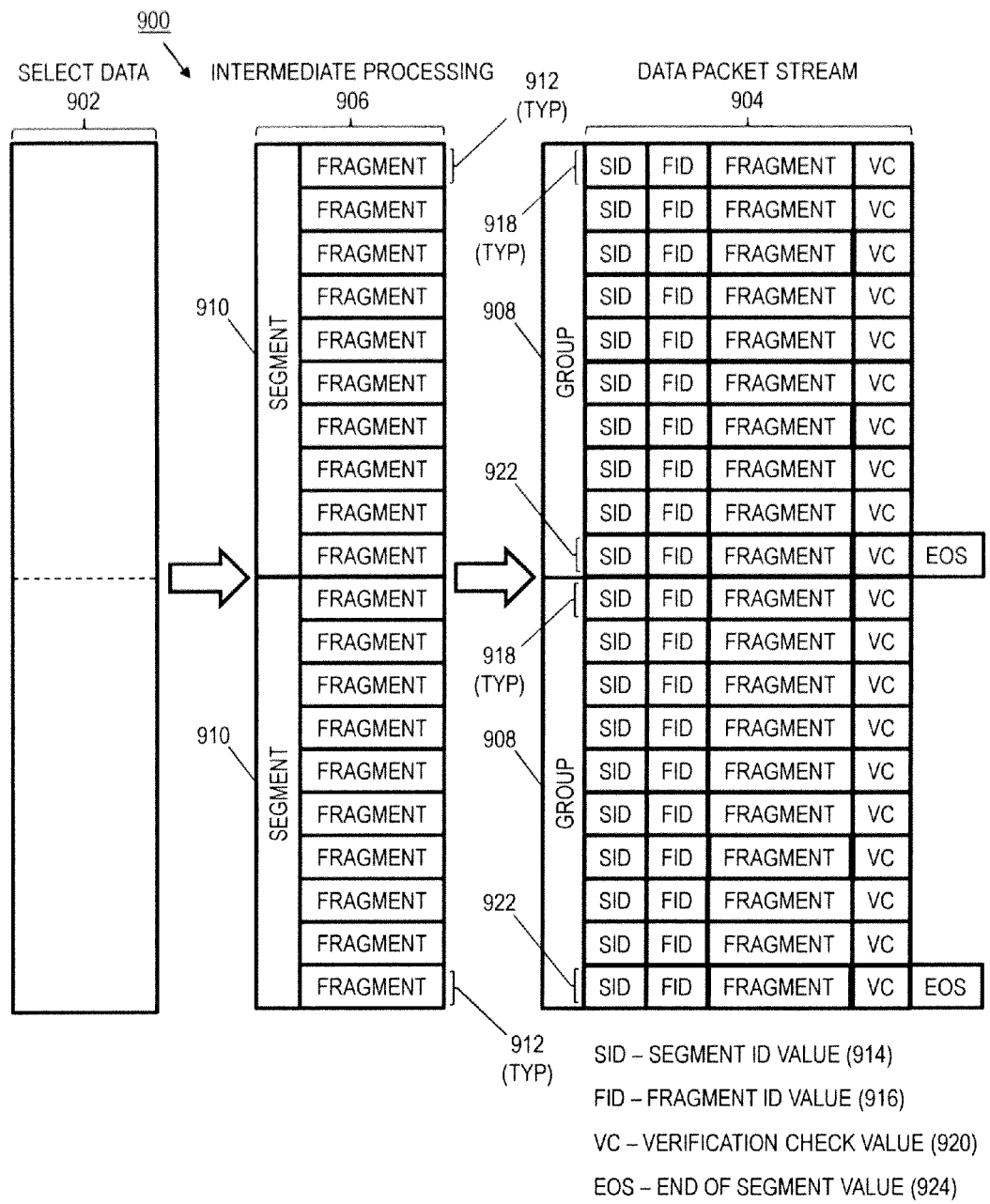
FIG. 9 is a data flow diagram for an exemplary embodiment of a process for processing select data to form a stream of data packets.

With reference to FIG. 9, a data flow diagram shows an exemplary embodiment of a process 900 for processing select data 902 to form a stream of data packets 904 using an intermediate process 906 at a sending node for transporting the select data 902 from the sending node to a destination node via one or more communication paths. The stream of data packets 904 comprising two or more groups 908 of data packets. Each group 908 of data packets carrying a segment 910 of the select data 902. Each segment 910 comprising a plurality of fragments 912 of the select data 902. Each segment 910 associated with a unique segment identifier 914 in relation to the select data 902. Each fragment 912 associated with a unique fragment identifier 916 in relation to at least one of the corresponding segment 910 and the select data 902. Each data packet 918 of each group carries a corresponding fragment 912 of the corresponding plurality of fragments, a fragment identification value 916 representing the fragment identifier associated with the corresponding fragment 912, a segment identification value 914 representing the segment identifier associated with the corresponding segment 910, and a verification check value 920 for use in verifying the corresponding data packet. A last data packet 922 of each group 908 carries an end of segment value 924 identifying the corresponding data packet 918 as the last data packet 922 of the corresponding group 908.

Figure 10:
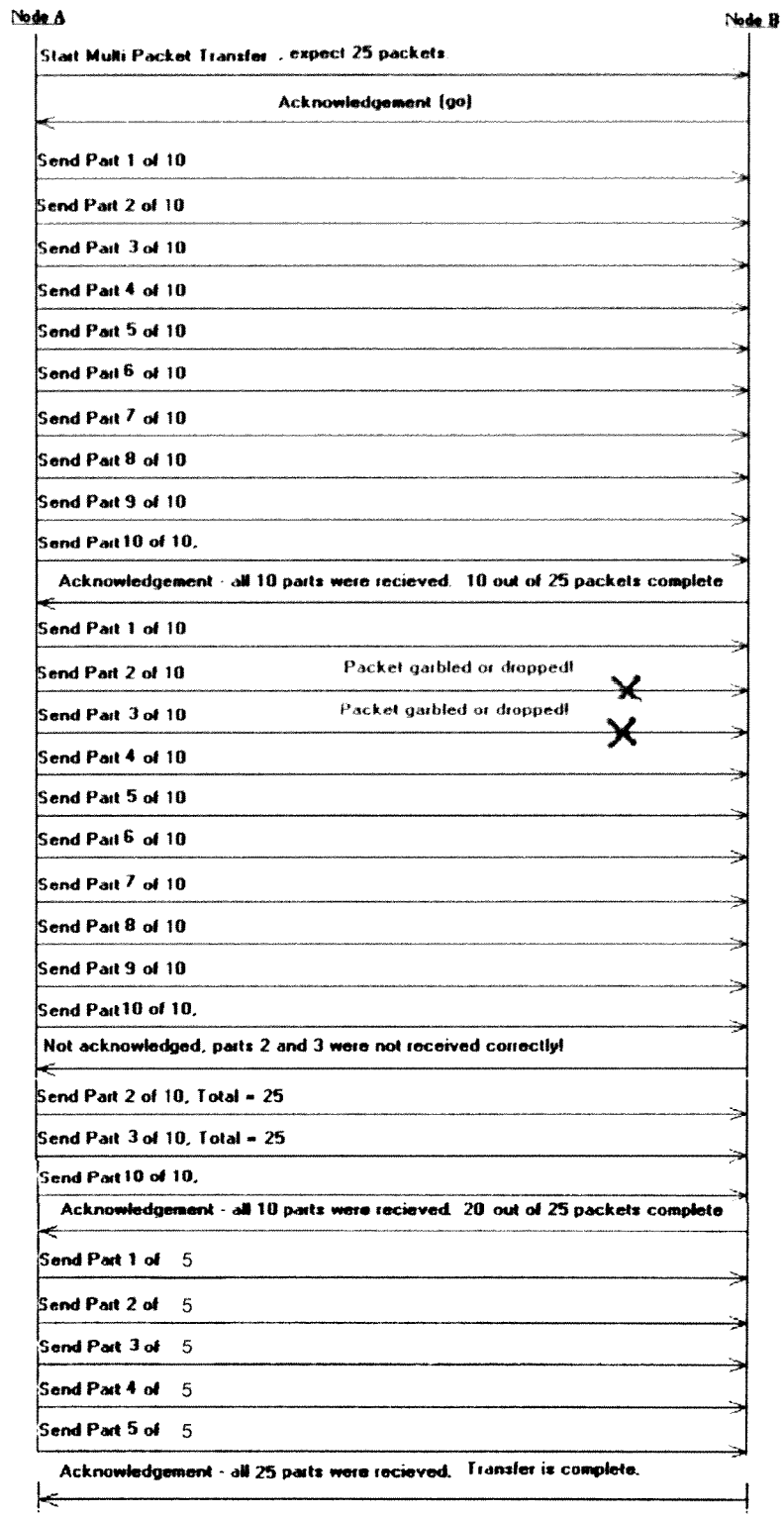
FIG. 10 is a data/message flow diagram for an exemplary embodiment of a process for transporting data from a sending node to a destination node.

With reference to FIG. 10, a data flow diagram shows how data packets and response messages are exchanged for an exemplary scenario of a process for transporting data from a sending node (Node A) to a destination node (Node B). Node A is an endpoint that is processing select data and transmitting data packets to a destination endpoint (Node B).

Node A and Node B exchange initial messages based on an initiating event. The initial message from Node A provides notice to Node B to expect 25 packets in a multi-packet transfer. Node B sends a response message with an acknowledgment (go) that the initial message was received. The initial messages may established an agreed upon size for a data fragment carried by each data packet and an agreed upon amount of fragments in data segments carried by groups of data packets. Node A proceeds with transmission of a first group of data packets in a consecutive stream. The first group comprising ten data packets and carrying a first data segment comprising ten corresponding data fragments. In this scenario, Node B successfully receives all ten data packets of the first group. After successfully receiving the last data packet of the first group, Node B sends a response message to Node A acknowledging receipt of all data packets in the first group.

Node A proceeds with transmission of a second group of data packets in a consecutive stream. The second group comprising ten data packets and carrying a second data segment comprising ten corresponding data fragments. In this scenario, Node B either does not receive the second and third data packets of the second group or the verification check on the second and third data packets fails. After successfully receiving the last data packet of the second group, Node B sends a response message to Node A indicating the second and third data packets were not successfully received.

Node A proceeds with retransmission of the second, third, and last data packets of the second group of data packets in a consecutive stream. In this scenario, Node B successfully receives the second, third, and last data packets of the second group. After successfully receiving the last data packet via the retransmission, Node B sends a response message to Node A acknowledging receipt of all data packets in the second group.

Node A proceeds with transmission of a third group of data packets in a consecutive stream. The third group comprising five data packets and carrying a third data segment comprising five corresponding data fragments. In this scenario, Node B successfully receives all five data packets of the third group. After successfully receiving the last data packet of the third group, Node B sends a response message to Node A acknowledging receipt of all data packets in the third group.

Figure 11:
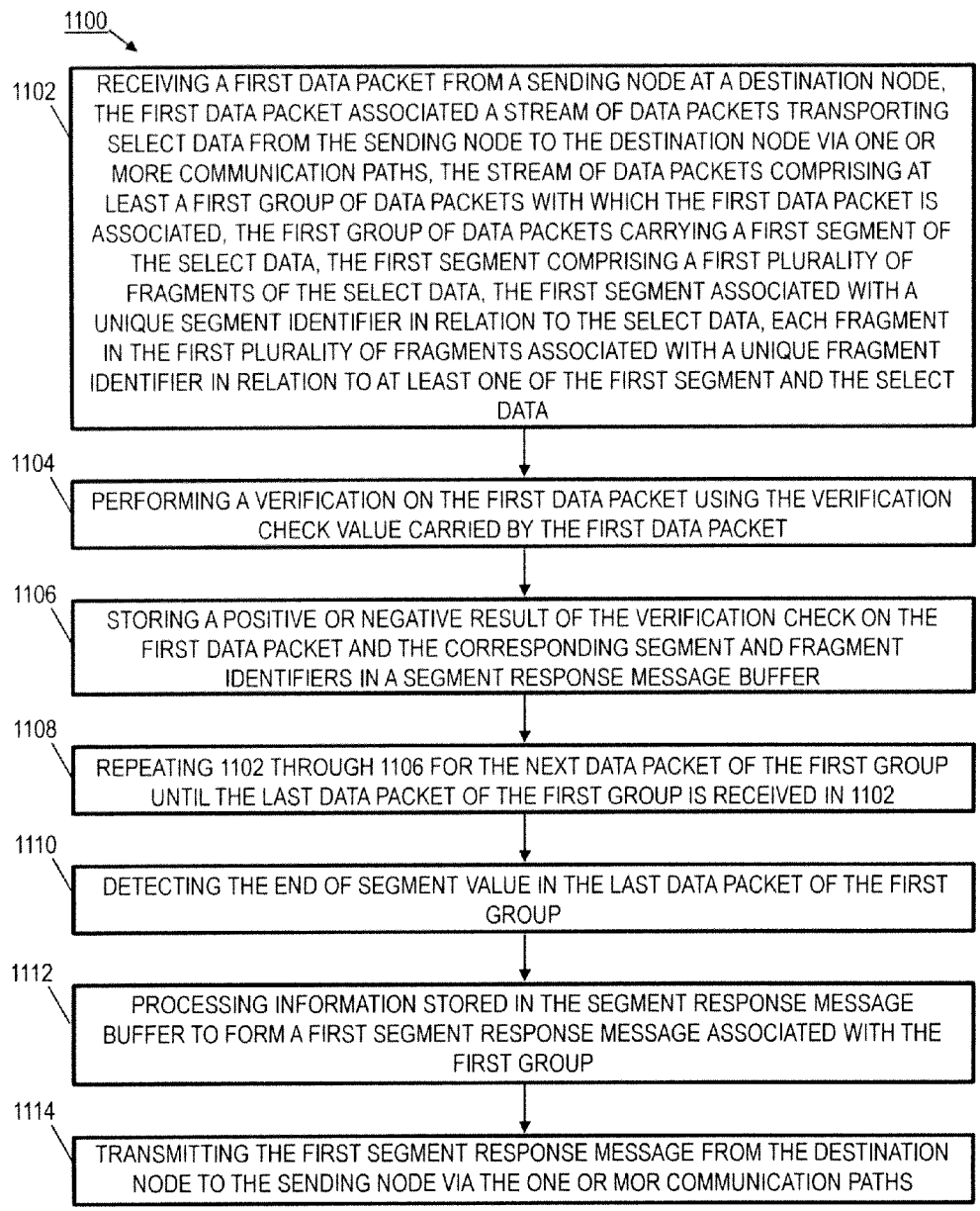
FIG. 11 is a flow chart of another exemplary embodiment of a process for transporting data from a sending node to a destination node.

With reference to FIG. 11, another exemplary embodiment of a process 1100 for transporting data from a sending node to a destination node begins at 1102 where a first data packet is received from a sending node at a destination node. The first data packet associated a stream of data packets transporting select data from the sending node to the destination node via one or more communication paths. The stream of data packets comprising at least a first group of data packets with which the first data packet is associated. The first group of data packets carrying a first segment of the select data. The first segment comprising a first plurality of fragments of the select data. The first segment associated with a unique segment identifier in relation to the select data. Each fragment in the first plurality of fragments associated with a unique fragment identifier in relation to at least one of the first segment and the select data.

Each data packet of the first group carries a corresponding fragment of the first plurality of fragments, a fragment identification value representing the fragment identifier associated with the corresponding fragment, a segment identification value representing the segment identifier associated with the first segment, and a verification check value for use in verifying the corresponding data packet. A last data packet of the first group carries an end of segment value identifying the corresponding data packet as the last data packet of the first group.

At 1104, a verification check is performed on the first data packet using the verification check value carried by the first data packet. Next, a positive or negative result of the verification check on the first data packet and the corresponding segment and fragment identification values is stored in a segment response message buffer (1106). At 1108, the process 1100 continues by repeating 1102 through 1106 for the next data packet of the first group until the last data packet of the first group is received in 1102.

At 1110, after 1102 through 1106 are performed for the last data packet of the first group, the process 1100 continues by detecting the end of segment value in the last data packet of the first group. Next, information stored in the segment response message buffer is processed to form a first segment response message associated with the first group (1112). At 1114, the first segment response message is transmitted from the destination node to the sending node via the one or more communication paths.

In another embodiment of the process 1100, the first segment response message to the sending node indicates all data packets of the first group were successfully received and verified by the destination node. In this embodiment, the process 1100 also includes repeating 1102 through 1114 for a second group of data packets, a second segment of the select data, a second plurality of fragments of the select data, and a second segment response message. In the embodiment being described, the stream of data packets also comprises at least the second group of data packets, the second group of data packets carries the second segment, and the second segment comprises the second plurality of fragments.

In yet another embodiment of the process 1100, the first segment response message to the sending node indicates at least one data packet of the first group was not successfully received and verified by the destination node. In a further embodiment of the process 1100, the first segment response message to the sending node indicates the segment and fragment identifiers associated with each data packet of the first group that was not successfully received and verified.

In another further embodiment, the process 1100 also includes determining at least one data packet associated with the first group was not received by the destination node based at least in part on the processing in 1112 showing a disruption in sequencing of fragment identifiers stored in the segment response message buffer for the first group of data packets. In yet another further embodiment, the process 1100 also includes determining at least one data packet associated with the first group failed the verification check in 1104 based at least in part on the processing in 1112 showing a negative result stored in the segment response message buffer for the corresponding data packet.

In still another further embodiment, the process 1100 also includes receiving a first retransmitted data packet from the sending node at the destination node. The first retransmitted data packet from the at least one data packet of the first group that was not successfully received and verified by the destination node. In this embodiment, the process 1100 continues by performing a verification check on the first retransmitted data packet using the verification check value carried by the first retransmitted data packet and storing a positive or negative result of the verification check on the first retransmitted data packet in the segment response message buffer. In this embodiment, these steps are repeated for the next retransmitted data packet from the at least one data packet of the first group that was not successfully received and verified by the destination node until the last data packet of the first group is retransmitted and received. After the retransmitted last data packet is received, the end of segment value in the retransmitted last data packet of the first group is detected. Then, information stored in the segment response message buffer is processed to form a first segment retransmission message associated with the first group. Next, the first segment retransmission message is transmitted from the destination node to the sending node via the one or more communication paths.

Figure 12:
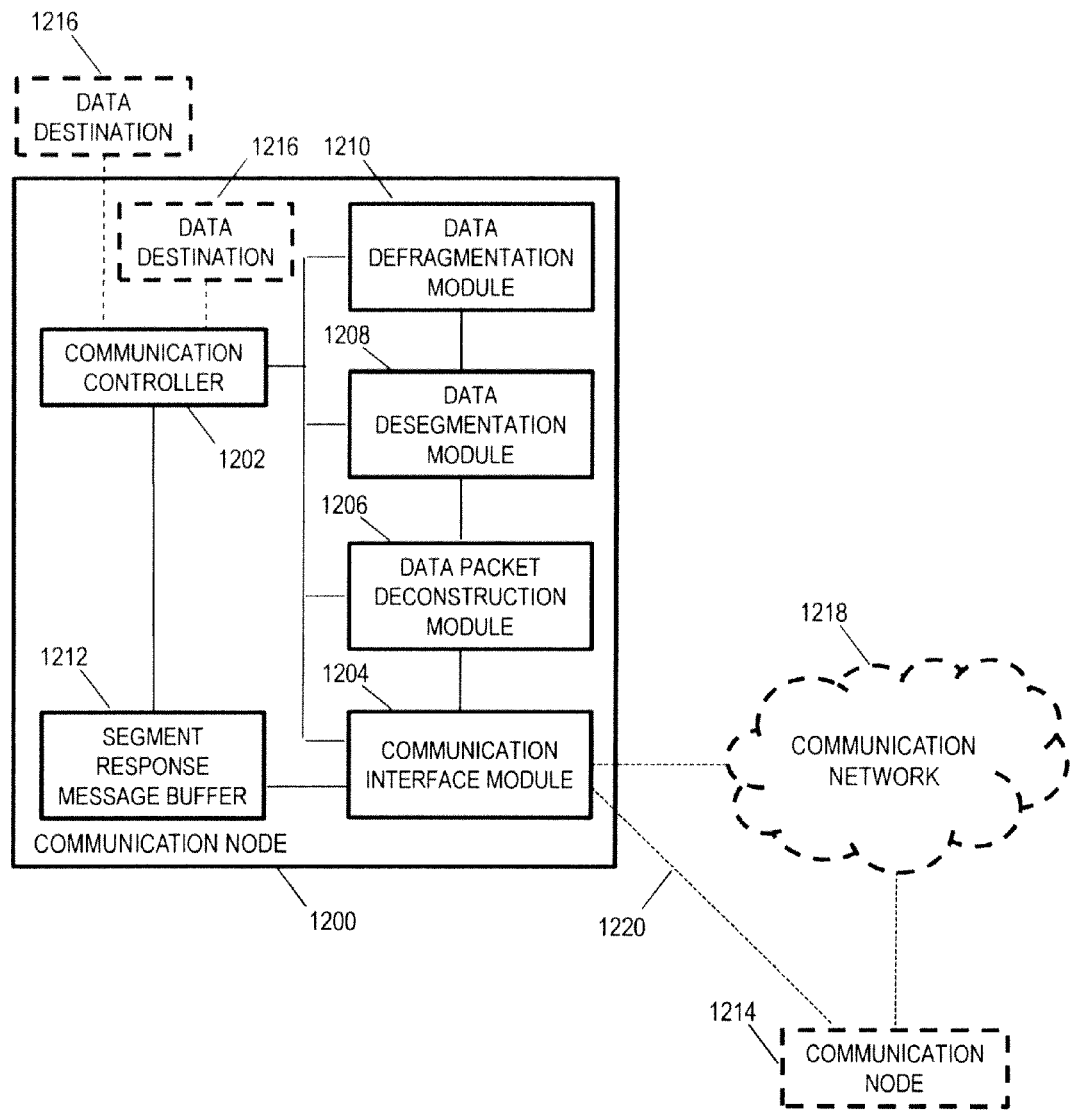
FIG. 12 is a block diagram of another exemplary embodiment of a communication node for transporting data from a sending node to a destination node.

With reference to FIG. 12, an exemplary embodiment of a communication node 1200 includes a communication interface module 1204, a data packet deconstruction module 1206, a data desegmentation module 1208, a data defragmentation module 1210, and a segment response message buffer 1212. The communication node 1200 (i.e., destination node) for receiving data transported by another communication node 1214 (i.e., sending node). The communication controller 1202 for controlling the receiving of a stream of data packets by the communication interface module 1204 from the sending node 1214. The stream of data packets may be transported from the sending node 1214 via a communication network 1218 accessible to both the destination node 1200 and sending node 1214.

The communication network 1218 may include any suitable type of communication network. In various embodiments, the communication network 1218 may include multiple communication networks and multiple types of communication networks in any suitable combination. For example, the communication network 1218 may include any combination of a LAN, WAN, wired network, wireless network, cellular network, satellite communication network, telephone network, PSTN, radio communication network, satellite television network, a cable television network, intranet, internet (including the Internet), and any suitable communication network. The stream of data packets may be transported from the sending node 1214 via one or more communication paths through the communication network 1218. In another embodiment, the stream of data packets may be transported from the sending node 1214 via a direct communication path 1220 between the destination node 1200 and sending node 1214.

The communication controller 1202 also for controlling reverse processing of data packets by the data packet deconstruction module 1206, data desegmentation module 1208, and data defragmentation module 1210 to unwrap select data for a data destination 1216. The data destination 1216 may be a storage device, a processing device, an application program, or any suitable destination of data.

The data packet deconstruction module 1206 for capturing groups of data packets from the stream, deconstructing the groups into individual data packets, and deconstructing the individual data packets to recover data fragments and data segments and information carried by the corresponding data packets. The data desegmentation module for capturing and arranging data fragments from the data packets into data segments. The data defragmentation module for capturing and arranging data fragments of data segments to form corresponding portions of select data transported to the destination node 1200 via the stream of data packets.

The communication interface module 1204 for receiving a first data packet from the sending node 1214 at the destination node 1200. The first data packet associated a stream of data packets transporting select data from the sending node 1214 to the destination node 1200 via one or more communication paths. The stream of data packets comprising at least a first group of data packets with which the first data packet is associated. The first group of data packets carrying a first segment of the select data. The first segment comprising a first plurality of fragments of the select data. The first segment associated with a unique segment identifier in relation to the select data. Each fragment in the first plurality of fragments associated with a unique fragment identifier in relation to at least one of the first segment and the select data. In this embodiment, each data packet of the first group carries a corresponding fragment of the first plurality of fragments, a fragment identification value representing the fragment identifier associated with the corresponding fragment, a segment identification value representing the segment identifier associated with the first segment, and a verification check value for use in verifying the corresponding data packet. A last data packet of the first group carries an end of segment value identifying the corresponding data packet as the last data packet of the first group.

The communication controller 1202 for performing a verification check on the first data packet using the verification check value carried by the first data packet, for storing a positive or negative result of the verification check on the first data packet and the corresponding segment and fragment identification values in the segment response message buffer 1212, and for repeating the receiving, performing a verification check, and storing results for the next data packet of the first group until the last data packet of the first group is received. After the last data packet is received, the communication controller 1202 for detecting the end of segment value in the last data packet of the first group, for processing information stored in the segment response message buffer 1212 to form a first segment response message associated with the first group, and for controlling the communication interface module 1204 to transmit the first segment response message from the destination node 1200 to the sending node 1214 via the one or more communication paths.

In another embodiment of the communication node 1200, after sending a first segment response message from the communication controller 1202 to the sending node 1214 via the communication interface module 1204 indicating all data packets of the first group were successfully received and verified by the destination node 1200, the communication controller 1202 controls the communication interface module 1204, data packet deconstruction module 1206, data desegmentation module 1208, and data defragmentation module 1210 for a second group of data packets, a second segment of the select data, a second plurality of fragments of the select data, and a second segment response message. In this embodiment, the stream of data packets also comprises at least the second group of data packets, the second group of data packets carries the second segment, and the second segment comprises the second plurality of fragments.

In yet another embodiment of the communication node 1200, after sending a first segment response message from the communication controller 1202 to the sending node 1214 via the communication interface module 1204 indicating at least one data packet of the first group was not successfully received and verified by the destination node 1200. In a further embodiment of the communication node 1200, the first segment response message to the sending node 1214 indicates the segment and fragment identifiers associated with each data packet of the first group that was not successfully received and verified.

In another further embodiment of the communication node 1200, the communication controller 1202, in conjunction with at least one of the data desegmentation module 1208 and data defragmentation module 1210, determines at least one data packet associated with the first group was not received by the destination node 1200 based at least in part on the segment response message buffer 1212 showing a disruption in sequencing of fragment identifiers for the first group of data packets. In yet another further embodiment of the communication node 1200, the communication controller 1202, in conjunction with at least one of the data packet deconstruction module 1206, determines at least one data packet associated with the first group failed the verification check based at least in part on the segment response message buffer 1212 showing a negative result for the corresponding data packet.

In still another further embodiment of the communication node 1200, the communication interface module 1204 for receiving a first retransmitted data packet from the sending node 1214 at the destination node 1200. The first retransmitted data packet from the at least one data packet of the first group that was not successfully received and verified by the destination node. In this embodiment, the communication controller 1202 performs a verification check on the first retransmitted data packet using the verification check value carried by the first retransmitted data packet, stores a positive or negative result of the verification check on the first retransmitted data packet in the segment response message buffer, and repeats the receiving, performing the verification check, and storing results for the next retransmitted data packet from the at least one data packet of the first group that was not successfully received and verified by the destination node until the last data packet of the first group is retransmitted and received. After the last retransmitted data packet is received, the communication controller 1202 detects the end of segment value in the retransmitted last data packet of the first group, processes information stored in the segment response message buffer 1212 to form a first segment retransmission message associated with the first group, and controls the communication into face module 1204 to transmit the first segment retransmission message from the destination node 1200 to the sending node 1214 via the one or more communication paths.

With reference again to FIG. 3, an exemplary embodiment of a non-transitory computer-readable medium storing program instructions that, when executed by a computer, cause a corresponding computer-controlled communication node to perform a process 300 for transporting data from a sending node to a destination node. In various additional embodiments, the program instructions stored in the non-transitory computer-readable memory, when executed by the computer, may cause the computer-controlled router to perform various combinations of functions associated with the processes 400, 500, 600, 700, 1100 for transporting data from a sending node to a destination node with reference to FIGS. 4-7 and 11. In other words, the various embodiments of the processes described above may be implemented by the program instructions stored in the non-transitory computer-readable medium.

Likewise, in various embodiments, the program instructions stored in the non-transitory computer-readable medium, when executed by the computer, may cause the computer-controlled communication node to perform various combinations of functions associated with the various embodiments of the communication node 800, 1200 described above with reference to FIGS. 8 and 12. For example, the computer-controlled device may include a communication node 800, 1200. Any suitable module described above with reference to FIGS. 8 and 12 may include the computer and non-transitory computer-readable medium associated with the program instructions. Alternatively, the computer and non-transitory computer-readable medium associated with the program instructions may be individual or combined components that are in operative communication with any suitable combination of the modules described above with reference to FIGS. 8 and 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of transporting data, comprising:
   a) processing select data to form a stream of data packets, the stream of data packets comprising at least a first group of data packets, the first group of data packets carrying a first segment of the select data, the first segment comprising a first plurality of fragments of the select data, the first segment associated with a unique segment identifier in relation to the select data, each fragment in the first plurality of fragments associated with a unique fragment identifier in relation to at least one of the first segment and the select data, the unique fragment identifier being different from the unique segment identifier, wherein each data packet of the first group carries a corresponding fragment of the first plurality of fragments, the fragment identifier associated with the corresponding fragment, the segment identifier associated with the first segment, and a verification check value for use in verifying the corresponding data packet, wherein a last data packet of the first group carries an end of segment value identifying the corresponding data packet as the last data packet of the first group; and b) transmitting the first group from a sending node to a destination node via one or more communication paths, with the last data packet of the first group being transmitted last such that the transmitting continues without waiting for a first segment response message from the destination node between transmissions of the data packets of the first group.

2. The method of claim 1 wherein the fragments of the select data are a size known to both the sending node and the destination node.

3. The method of claim 1 wherein a quantity of fragments for the first plurality of fragments that form the first segment is known to both the sending node and the destination node.

4. The method of claim 1 wherein the verification check value associated with each data packet is a checksum value for the corresponding data packet.

5. The method of claim 1, further comprising:
c) storing the first group of data packets in a segment transmit buffer at the sending node at least until a first segment response message is received from the destination node indicating ad data packets of the first group were successfully received and verified h the destination node.

6. The method of claim 1, further comprising:
c) receiving a first segment response message at the sending node from the destination node indicating all data packets of the first group were successfully received and verified by the destination node; and
d) repeating a) and b) for a second group of data packets, a second segment of the select data, and a second plurality of fragments of the select data, wherein the stream of data packets also comprises at least the second group of data packets, the second group of data packets carries the second segment, and the second segment comprises the second plurality of fragments.

7. The method of claim 1, further comprising:
c) receiving a first segment response message at the sending node from the destination node indicating at least one data packet of the first group was not successfully received and verified by the destination node: and
d) retransmitting each data packet of the first group that was not successfully received and verified by the destination node and retransmitting the last data packet of the first group from the sending node to the destination node such that the retransmitting continues without waiting for another segment response message from the destination node between retransmissions.

8. The method of claim 7 wherein the first segment response message from the destination node indicates the segment and fragment identifiers associated with each data packet of the first group that was not successfully received and verified.

9. The method of claim 1, further comprising:
c) retransmitting the last data packet of the first group from the sending node to the destination node if no segment response message was received from the destination node within a predetermined time after the last data packet of the first group was transmitted to the destination node.

10. A method comprising:
processing data into a plurality of data segments, each comprising a plurality of data fragments, wherein the data fragments include respective fragment identifiers and a segment identifier of the segment of which they are a part, the respective fragment identifiers being different from the ssgment identifier;
transmitting the data fragments, including the respective fragment identifiers and segment identifier, from a sending node to a destination node;
responsive to receiving a first message from the destination node indicating that one or more fragments of one of the segments was not received by the destination node, communicating said one or more fragments to the destination node along with a final fragment of said one of the segments to indicate re-transmission; and
subsequent to communicating each segment, if the sending node does not receive the first message or a second message indicating successful receipt of the segment, re-communicating the last fragment of the segment to the destination node.

11. A non-transitory computer-readable medium storing program instructions that, when executed by a computer, cause a corresponding computer-controlled communication node to perform a method of transporting data, the method comprising:
a) processing first select data to form a first stream of data packets, the first stream of data packets comprising at least a first group of data packets, the first group of data packets carrying a first segment of the first select data, the first segment comprising a first plurality of fragments of the first select data the first segment associated with a unique segment identifier in relation to the first select data, each fragment in the first plurality of fragments associated with a unique fragment identifier in relation to at least one of the first segment and the first select data, the unique fragment identifier being different from the unique segment identifier, wherein each data packet of the first group carries a corresponding fragment of the first plurality of fragments, the fragment identifier associated with the corresponding fragment, the segment identifier associated with the first segment, and a verification check value fix- use in verifying the corresponding data packet, wherein a last data packet of the first group carries an end of segment value identifying the corresponding data packet as the last data packet of the first group; and
b) transmitting the first group from a communication node to a destination node via one or more communication paths, with the last data packet of the first group being transmitted last such that the transmitting continues without waiting for a first segment response message from the destination node between transmissions of the data packets of the first group.

12. The non-transitory computer-readable medium of claim 11, the method further comprising:

c) receiving a first segment response message at the communication node from the destination node indicating at least one data packet of the first group was not successfully received and verified by the destination node; and d) retransmitting each data packet of the first group that was not successfully received and verified by the destination node and retransmitting the last data packet of the first group from the communication node to the destination node such that the retransmitting continues without waiting for another segment response message from the destination node between retransmissions.

13. The non-transitory computer-readable medium of claim 11, the method further comprising:

c) retransmitting the last data packet of the first group from the communication node to the destination node if no segment response message was received from the destination node within a predetermined time after the last data packet of the first group was transmitted to the destination node.

14. The non-transitory computer-readable medium of claim 11, the method further comprising:

c) receiving a first data packet from a sending node at the communication node, the first data packet associated a second stream of data packets transporting second select data from the sending node to the communication node via the one or more communication paths, the second stream of data packets comprising at least a first group of data packets with which the first data packet is associated, the first group of data packets carrying a first segment of the second select data, the first segment comprising a first plurality of fragments of the second select data, the first segment associated with a unique segment identifier in relation to the second select data, each fragment in the first plurality of fragments associated with a unique fragment identifier in relation to at least one of the first segment and the second select data, wherein each data packet of the first group carries a corresponding fragment of the first plurality of fragments, the fragment identifier associated with the corresponding fragment, the segment identifier associated with the first segment, and a verification check value for use in verifying the corresponding data packet, wherein a last data packet of the first group carries an end of segment value identifying the corresponding data packet as the last data packet of the first group;

d) performing a verification check on the first data packet using the verification check value carried by the first data packet;

e) storing a positive or negative result of the verification check on the first data packet and the corresponding segment and fragment identifiers in a segment response message buffer;

f) repeating c) through e) for the next data packet of the first group until the last data packet of the first group is received in c);

g) detecting the end of segment value in the last data packet of the first group;

h) processing information stored in the segment response message buffer to form a first segment response message associated with the first group; and i) transmitting the first segment response message from the communication node to the sending node via the one or more communication paths.

* * * * *